United States Patent
Iwamura

(10) Patent No.: US 7,200,231 B2
(45) Date of Patent: Apr. 3, 2007

(54) INFORMATION PROCESSING SYSTEM, INFORMATION PROCESSING APPARATUS, AND COMPUTER-READABLE RECORDING MEDIUM

(75) Inventor: Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 116 days.

(21) Appl. No.: 11/095,845

(22) Filed: Apr. 1, 2005

(65) Prior Publication Data

US 2005/0172125 A1 Aug. 4, 2005

Related U.S. Application Data

(62) Division of application No. 09/537,877, filed on Mar. 29, 2000, now Pat. No. 6,922,777.

(30) Foreign Application Priority Data

Mar. 31, 1999 (JP) ............................. 11/093000

(51) Int. Cl.
*G06K 9/00* (2006.01)
*G06F 7/04* (2006.01)
*H04L 9/00* (2006.01)

(52) U.S. Cl. .......................................... 380/201; 726/32

(58) Field of Classification Search .................. 726/30, 726/31, 32, 27, 23, 22, 19, 7; 380/201
See application file for complete search history.

(56) References Cited

U.S. PATENT DOCUMENTS

| | | | |
|---|---|---|---|
| 5,600,720 A | 2/1997 | Iwamura et al. ................ 380/1 |
| 5,666,419 A | 9/1997 | Yamamoto et al. ........... 380/28 |
| 5,937,395 A | 8/1999 | Iwamura ...................... 705/30 |
| 5,949,885 A | 9/1999 | Leighton ..................... 380/54 |
| 6,031,914 A | 2/2000 | Tewfik et al. ................. 380/54 |
| 6,088,454 A * | 7/2000 | Nagashima et al. ........ 380/286 |
| 6,128,736 A * | 10/2000 | Miller ......................... 713/176 |
| 6,134,659 A | 10/2000 | Sprong et al. .............. 713/190 |
| 6,236,087 B1 * | 5/2001 | Daly et al. .................. 257/355 |
| 6,256,736 B1 * | 7/2001 | Coppersmith et al. ...... 713/176 |
| 6,320,675 B1 | 11/2001 | Sakaki et al. ................ 358/1.9 |
| 6,373,960 B1 | 4/2002 | Conover et al. ............ 382/100 |
| 6,425,081 B1 * | 7/2002 | Iwamura ..................... 713/176 |
| 6,480,607 B1 * | 11/2002 | Kori et al. ................... 380/201 |
| 6,513,118 B1 * | 1/2003 | Iwamura ..................... 713/176 |
| 6,535,616 B1 | 3/2003 | Hayashi et al. ............. 382/100 |
| 6,560,339 B1 | 5/2003 | Iwamura ..................... 380/201 |

(Continued)

FOREIGN PATENT DOCUMENTS

EP 901124 3/1999

(Continued)

*Primary Examiner*—Matthew Smithers
(74) *Attorney, Agent, or Firm*—Fitzpatrick, Cella, Harper & Scinto

(57) ABSTRACT

In an information distribution processing system having a plurality of information processing apparatuses connected through a network, at least one of the plurality of information processing apparatuses can acquire distribution information to which is added first additional information as an electronic watermark using a first adding method, and second additional information as an electronic watermark using a second adding method. An extraction unit extracts the first additional information using the first adding method, and an identification unit identifies an information processing apparatus that is able to extract the second additional information, based on the first additional information.

55 Claims, 7 Drawing Sheets

| U.S. PATENT DOCUMENTS | | | | FOREIGN PATENT DOCUMENTS | | |
|---|---|---|---|---|---|---|
| 6,574,350 B1 | 6/2003 | Rhoads et al. ............... 382/100 | | JP | 10-164548 | 6/1998 |
| 6,678,389 B1 | 1/2004 | Sun et al. ................... 382/100 | | JP | 10-294726 | 11/1998 |
| 6,700,993 B1 | 3/2004 | Minematsu ................. 382/100 | | | | |
| 6,721,438 B1 | 4/2004 | Iwamura et al. ............ 382/100 | | * cited by examiner | | |

INFORMATION PROCESSING SYSTEM, INFORMATION PROCESSING APPARATUS, AND COMPUTER-READABLE RECORDING MEDIUM

This application is a division of application Ser No. 09/537,877 filed Mar. 29, 2000, now U.S. Pat. No. 6,922,777.

BACKGROUND OF THE INVENTION

1. Field of the Invention

The present invention relates to information processing systems, information processing apparatuses, and computer-readable recording media used in the systems or the apparatuses, suited to cases in which electronic-watermark information is embedded in input information, such as digital image data or digital sound data, to protect copyright, to prevent forgery, and to record various types of information.

2. Description of the Related Art

As computers and networks have been remarkably developed in recent years, various types of information, such as character data, image data, and sound data, has been handled in the computers and networks. Since such data is digital, it can be easily copied with its quality maintained. Therefore, to protect the copyright of such data, copyright information and user information are embedded in image data and sound data as electronic-watermark information (hereinafter just called an electronic watermark) in many cases.

With the use of an electronic-watermark technology, information which people cannot recognize with their senses of sight and hearing is confidentially embedded in image data or sound data. When an embedded electronic watermark is extracted from image data or sound data, copyright information, user information, and identification information are obtained, and illegitimate copying can be traced.

A first condition required for such an electronic watermark is a quality at which embedded information cannot be identified, namely, at which information is embedded in the original digital information such that the quality of the original digital information does not deteriorate.

A second condition is robustness with which information embedded in the original digital information remains, namely, with which embedded information is not lost even if editing, such as data compression and filtering, or an attack is applied.

A third condition is the amount of information to be embedded, which can be selected according to use.

These conditions, required for electronic watermarks, are generally tradeoffs to each other. When an electronic watermark having a high robustness is generated, for example, relatively large quality deterioration occurs and the amount of information to be embedded becomes small in many cases.

Methods for embedding electronic watermarks in multi-valued still pictures can be divided into two types, spatial-domain embedding methods and frequency-domain embedding methods.

In each of various electronic-watermark embedding methods, embedding processing corresponds to extracting processing one by one, and there are no compatibility. In general, it is said that spatial-domain embedding methods provide a low quality deterioration with a low robustness, whereas frequency-domain embedding methods provide a high robustness with a relatively high quality deterioration. Each method has a different feature, such as a high robustness with a small amount of embedded information, or a high quality with a low robustness.

To protect embedded information, information (hereinafter called a key) indicating algorithm, embedding positions, and changes are kept confidential in many cases. This is to enhance robustness to an intentional attack in which the algorithm and embedding positions are analyzed to remove electronic watermarks.

It can be considered to efficiently protect copyright that a monitoring organization for checking whether illegitimate copying is performed, by extracting electronic watermarks is provided. It is important for such a monitoring organization to keep the electronic-watermark method used and the key confidential to avoid an intentional attack.

As described above, there are various electronic-watermark methods each having its features. There are also many companies and associations which want to prevent illegitimate copying and illegitimate outputting of digital data by the use of electronic watermarks. If such companies and associations independently select electronic-watermark methods to embed electronic watermarks in data, since embedding processing and extracting processing correspond one by one in each of electronic-watermark methods and they are not compatible, the following problems occur.

1. It is difficult for one monitoring organization to perform united checking because electronic-watermark extracting processing is needed for each method.

2. To perform united checking by one monitoring organization, the monitoring organization needs to have all electronic-watermark extracting techniques, causing a large load.

3. The monitoring organization needs to manage the keys corresponding to all the extracting techniques confidentially and strictly.

4. When a monitoring organization is provided for each method, if an embedded electronic watermark cannot be extracted, it cannot be determined whether the embedded electronic watermark has been generated by a different method, or the electronic watermark is broken by an attack.

One monitoring organization refers to one configuration in terms of a system or a method, determined by standardization or a nation, rather than one physical organization.

SUMMARY OF THE INVENTION

Accordingly, it is an object of the present invention to efficiently protect copyrighted materials in various electronic-watermark methods.

The foregoing object is achieved in one aspect of the present invention through the provision of an information processing system in which a plurality of information processing apparatuses are connected through a network, at least one of the plurality of information processing apparatuses including first adding means for adding first additional information to input information by a first adding method; and second adding means for adding second additional information to the input information by a second adding method, wherein the first adding method has a higher robustness than the second adding method.

The foregoing object is achieved in another aspect of the present invention through the provision of an information processing system in which a plurality of information processing apparatuses are connected through a network, at least one of the plurality of information processing apparatuses including first extracting means for extracting first additional information from input information by a first extracting method; and second extracting means for extracting second additional information from the input information by a second extracting method identified by the extracted first additional information.

The foregoing object is achieved in still another aspect of the present invention through the provision of an information processing apparatus including first adding means for adding first additional information to input information at a high robustness by a first adding method; and second adding means for adding second additional information to the input information by a second adding method.

The foregoing object is achieved in yet another aspect of the present invention through the provision of an information processing apparatus including first extracting means for extracting first additional information from input information by a first extracting method; and second extracting means for extracting second additional information from the input information by a second extracting method identified by the extracted first additional information.

The foregoing object is achieved in still yet another aspect of the present invention through the provision of an information processing method including a first adding step of adding first additional information to input information at a high robustness by a first adding method; and a second adding step of adding second additional information to the input information by a second adding method.

The foregoing object is achieved in a further aspect of the present invention through the provision of an information processing method including a first extracting step of extracting first additional information from input information by a first extracting method; and a second extracting step of extracting second additional information from the input information by a second extracting method.

The foregoing object is achieved in a still further aspect of the present invention through the provision of a computer-readable recording medium for storing a program, the program including a first adding step of adding first additional information to input information at a high robustness; and a second adding step of adding second additional information to the input information.

The foregoing object is achieved in a yet further aspect of the present invention through the provision of a computer-readable recording medium for storing a program, the program including a first extracting step of extracting first additional information from input information; an identifying step of identifying an extracting method by the extracted first additional information; and a second extracting step of extracting second additional information from the input information by the identified extracting method.

Other objects and other features of the present invention will become clear by the following figures and descriptions.

DESCRIPTION OF THE PREFERRED EMBODIMENTS (First Embodiment)

Figure 1:
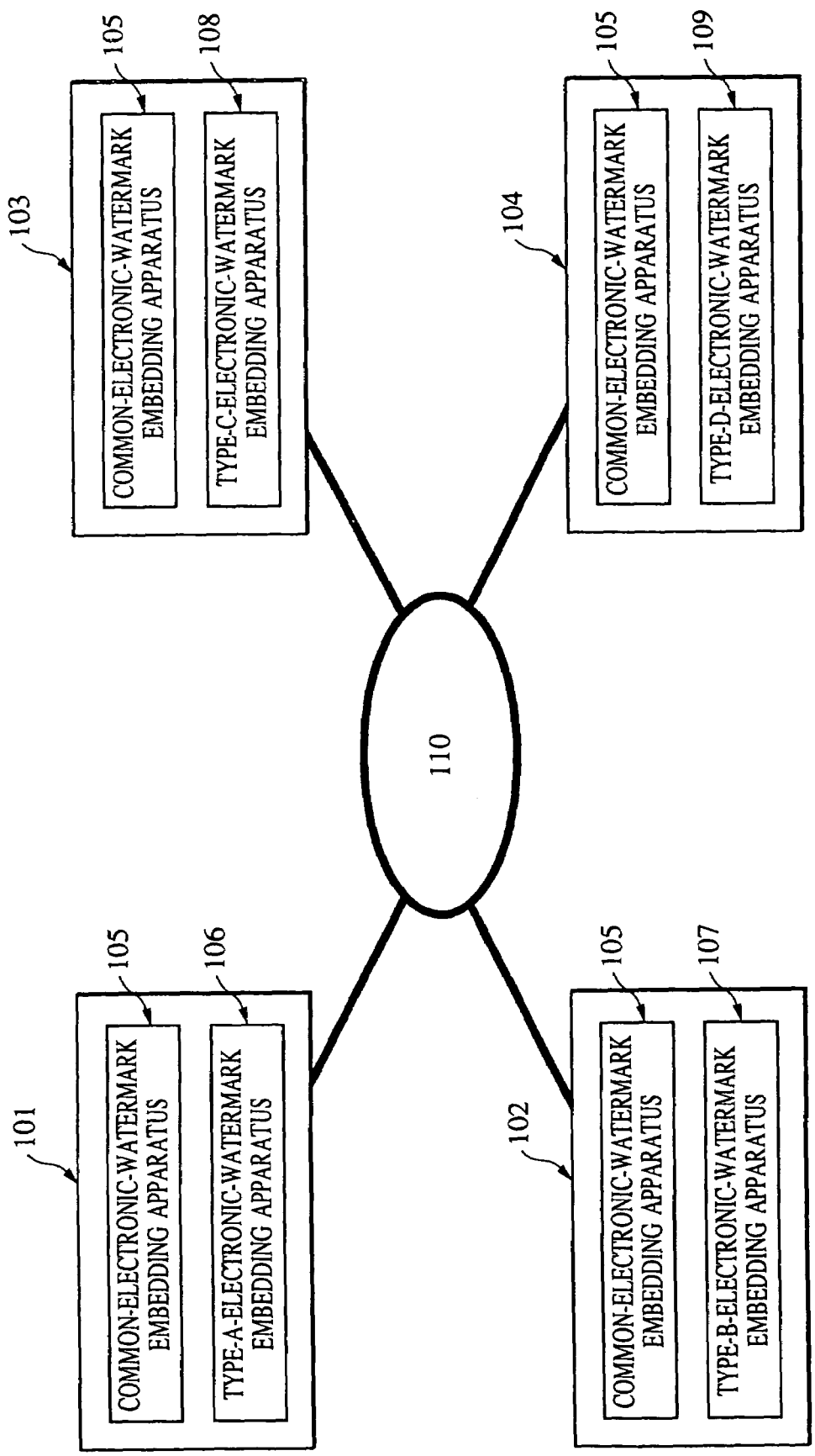
FIG. 1 is a block diagram of a portion related to electronic-watermark embedding in an information processing system according to a first embodiment of the present invention.

FIG. 1 shows a portion related to electronic-watermark embedding in an information processing system according to a first embodiment of the present invention. This system uses a common electronic-watermark method and electronic-watermark methods unique to monitoring organizations. The common electronic-watermark method refers to an electronic-watermark method determined by standardization or related organizations, and the features thereof will be described later.

In FIG. 1, organizations 101 to 104 perform electronic-watermark embedding processing with the use of different electronic-watermark methods. In the organizations 101 to 104, common-electronic-watermark embedding apparatuses 105 perform electronic-watermark embedding processing by the predetermined common electronic-watermark method, and a type-A-electronic-watermark embedding apparatus 106, a type-B-electronic-watermark embedding apparatus 107, a type-C-electronic-watermark embedding apparatus 108, and type-D-electronic-watermark embedding apparatus 109 perform electronic-watermark embedding by electronic-watermark methods independently determined by the organizations 101 to 104, respectively. A network 110 connect the organizations. The organizations 101 to 104 have communication means, not shown, for connecting to the network 110.

The common electronic-watermark method, which the common-electronic-watermark embedding apparatus 105 uses, has the following features.

1. Implements high-robustness electronic watermarks with a relatively small amount of information.

2. Extracts electronic watermarks without keys or with a common key.

3. Embeds information which identifies at least each electronic-watermark method or the organization which has performed embedding by the use of the method.

4. Has robustness to electronic-watermark embedding performed by each organization.

5. Sets a variable level of robustness in steps or continuously by the decision of each organization and attaches data indicating a robustness strength to information in which electronic watermarks are embedded, as additional information.

Various electronic-watermark methods having the foregoing methods can be considered. A method having a high robustness will be taken below as example.

Figure 7A:
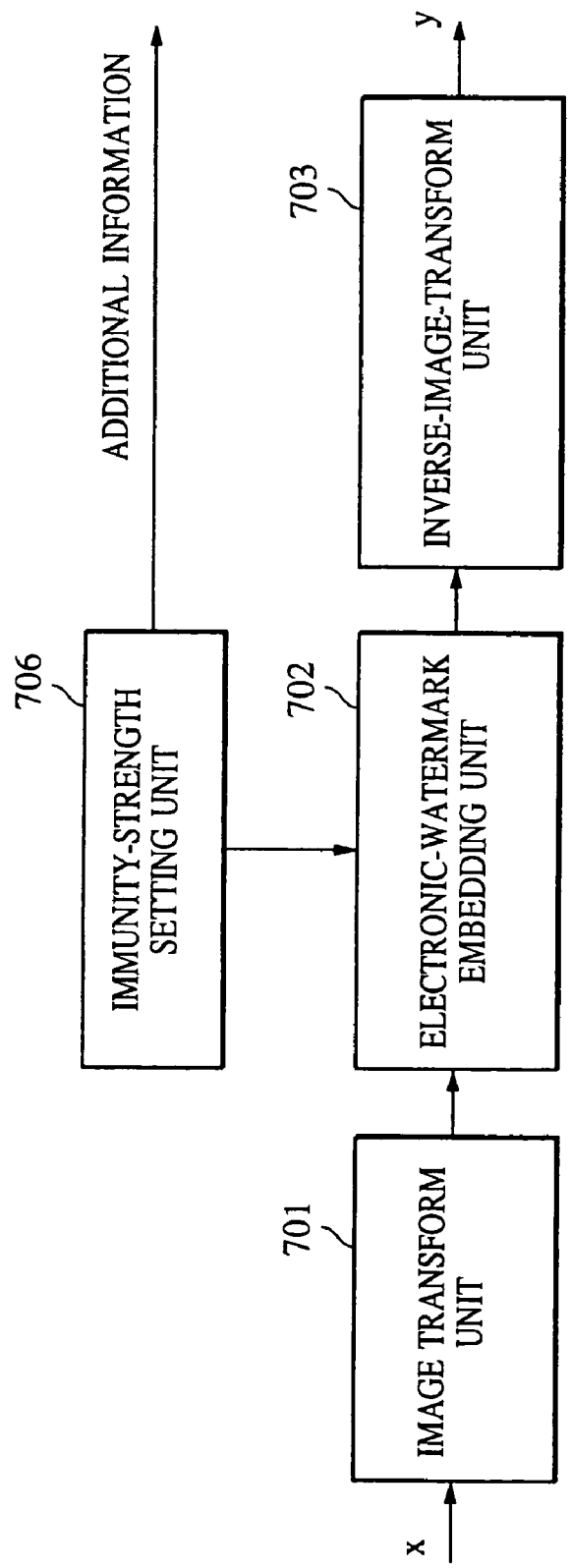
FIGS. 7A and 7B are block diagrams of an electronic-watermark embedding apparatus and an electronic-watermark extracting apparatus, respectively.
Figure 7B:
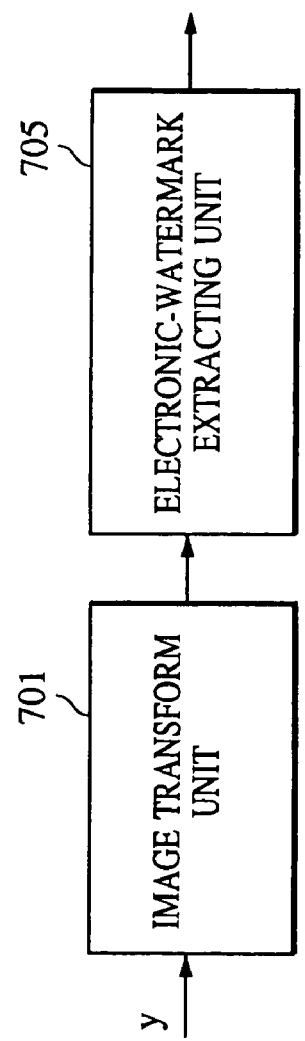

FIG. 7A shows an electronic-watermark embedding apparatus for performing the above-described embedding processing, and FIG. 7B shows an electronic-watermark extracting apparatus for performing the above-described extracting.

When a still picture is input as input data serving as a copyrighted material, the image data of the still picture is divided into eight-by-eight-pixel blocks and discrete cosine transform (DCT) is applied to each block. Hereinafter, a DCT-transformed block is called a DCT coefficient block, one coefficient in a DCT coefficient block is called a DCT coefficient, and a set of DCT coefficient blocks for one sheet of picture is called a DCT coefficient block group.

In the electronic-watermark embedding apparatus shown in FIG. 7A, an image transform unit 701 applies DCT to an input image "x" and the output of the image transform unit 701, a DCT coefficient block group, is input to an electronic-watermark embedding unit 702. The electronic-watermark embedding unit 702 selects one DCT coefficient block to be embedded among the input DCT coefficient block group, and quantizes one DCT coefficient in the DCT coefficient block to embed one embedding bit.

The size of a quantization step corresponds to the intensity of embedding, and the size of the quantization step and the position of the selected DCT coefficient correspond to key information.

As an example, the value of a DCT coefficient located at the coordinates "u" and "v" is called $s\{u, v\}$, a quantization step is called "h," and an electronic-watermark bit of 0 or 1 is embedded by the following rule.

$$ah < s\{u, v\} \leq (a+1)h \quad (1)$$

The following operation is executed, and a coefficient used after embedding is set to $c\{u, v\}$.

$$c\{u, v\} = bh + h/2 \text{ for an embedding bit of } 0 \quad (2)$$

where b is whichever of "a" and (a+1) is even.

$$c\{u, v\} = bh + h/2 \text{ for an embedding bit of } 1 \quad (3)$$

where b is whichever of "a" and (a+1) is odd.

Lastly, an inverse-image-transform unit 703 applies inverse DCT to the block group to change it back to eight-by-eight-pixel blocks and reconstructs them. Then, an image "fly" in which the electronic watermark has been embedded is obtained.

In the present embodiment, a setting unit 706 for variably setting the size of a quantization step and/or an embedding position to variably specify a robustness strength is provided. This setting unit sets the above factors according to various parameters such as a security level, automatically or by a manual operation of a person who monitors.

Data indicating the specified robustness strength is attached to the original data as additional information at a subsequent stage of the inverse-image-transform unit 703. According to this data, an extracting operation is specified at an extracting side.

The additional information may be common among the organizations, or may be encrypted so that a third party cannot obtain the robustness strength.

To extract the electronic watermark in the electronic-watermark extracting unit shown in FIG. 7B, the image "y" is input to an image transform unit 701, an electronic-watermark extracting unit 705 selects a DCT coefficient which has been embedded with key information among a DCT coefficient block group to which the same DCT is applied, "b" which satisfies the following expression is obtained, when "b" is even, it is determined that the embed ding bit is 0, and when "b" is odd, it is determined that the embedding bit is 1.

$$bh < c\{u, v\} \leq (b+1)h \quad (4)$$

A method for enhancing the robustness in this embedding method will be described below.

When a DCT coefficient indicating a low-frequency component is selected from a DCT coefficient block as a DCT coefficient to be embedded, the robustness is made strong. This is because, whereas high-frequency components are likely to be lost due to image compression or various types of filtering processing, low-frequency components are unlikely to be lost.

In the above embedding method, one DCT coefficient block is selected and one DCT coefficient is embedded. The number of DCT coefficient blocks to be selected and the number of DCT coefficients to be embedded can be increased to enhance the robustness. When only one DCT coefficient is embedded for one bit, it is highly possible that the value of the bit is lost due to image compression and various types of filtering processing. When the identical bits are embedded in a plurality of DCT coefficients, it is not highly possible that most of them are lost.

The robustness can be enhanced by applying error-correcting encoding to bits to be embedded themselves. This is because, even if some of the embedded bits are lost, they are recovered by an error-correcting code. It is clear that the robustness becomes stronger when the used error-correcting code has a higher error-correcting capability. Although the above techniques enhance the robustness, they may change low-frequency components of an image, or the quality of the image may deteriorate since many bits are embedded. Since identical bits are embedded with the use of many DCT coefficients, a small number of bits are embedded in many cases. If an inverse operation is performed, the robustness becomes weaker, but image quality is satisfactory and a large amount of information can be embedded in an electronic-watermark method.

The robustness-strength setting unit 706 may change the robustness strength by shifting an embedding position from a high-frequency side to a low-frequency side, or by changing the number of items to be embedded.

The above-described techniques for enhancing the robustness have the same tendency not only for methods employing DCT but also for methods employing wavelet transform or Fourier transform and methods for directly manipulating the luminance of a pixel.

An embedding procedure will be described below by referring to FIG. 1. For simplicity, 00, 01, 10, and 11 are embedded by the common electronic-watermark method, which are two-bit information for identifying the organizations 101 to 104. It is clear that other types of information can be embedded.

Each of the organizations 101 to 104 embeds the bit corresponding to each organization in distributed data by the common electronic-watermark method which has the above-described features 1 to 5 and has a high robustness with the use of the common-electronic-watermark embedding apparatus 105. Then, other types of information is embedded with the use of the type-A to type-D electronic-watermark embedding apparatuses 106 to 109 unique to the organizations. When the common electronic-watermark method does not interfere with an electronic-watermark method unique to an organization, namely, when electronic-watermark embedding processing does not affect the common electronic-watermark information, the embedding order can be reversed. In each organization, a different piece of information may be embedded. Alternatively, the same information may be embedded. Each organization can embed various types of information, such as copyright information, user information, and identification information.

Figure 2:
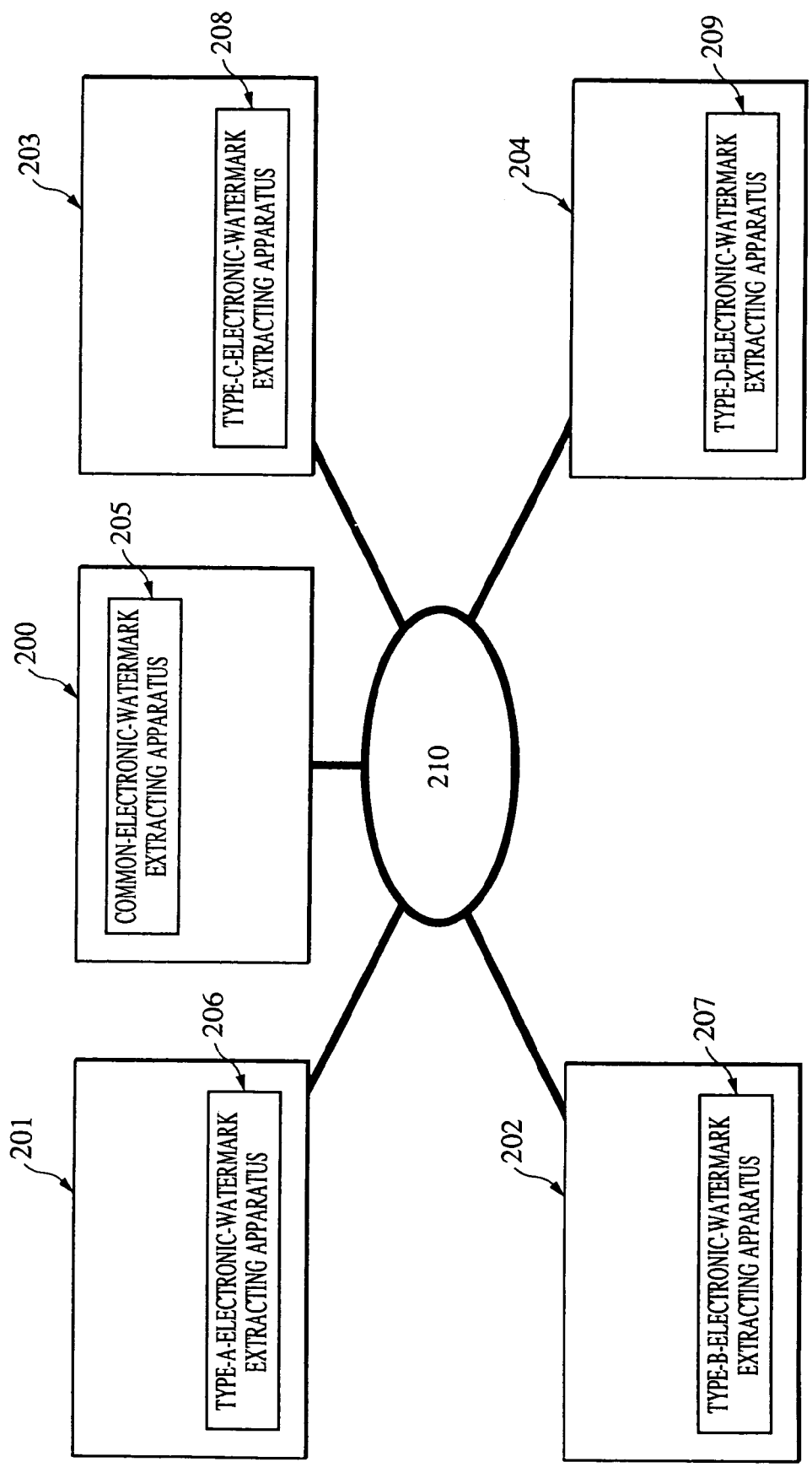
FIG. 2 is a block diagram of a portion related to electronic-watermark extracting in the information processing system according to the first embodiment of the present invention.

FIG. 2 shows a portion related to electronic-watermark extracting in the first embodiment.

In FIG. 2, there are provided a united monitoring organization 200, and electronic-watermark monitoring organizations 201 to 204 corresponding to the organizations 101 to 104 shown in FIG. 1, respectively. The united monitoring organization 200 has a common-electronic-watermark extracting apparatus 205 corresponding to the common-electronic-watermark embedding apparatus 105, and the organizations 201 to 204 include a type-A-electronic-watermark extracting apparatus 206, a type-B-electronic-watermark extracting apparatus 207, a type-C-electronic-watermark extracting apparatus 208, and a type-D-electronic-watermark extracting apparatus 209 corresponding to the type-A to type-D electronic-watermark embedding apparatuses 106 to 109 shown in FIG. 1, respectively. A network 210 connects the organizations 201 to 204. The organizations 201 to 204 have communication means, not shown, for connecting to the network 210. The network 210 may be identical with the network 110 shown in FIG. 1.

An electronic-watermark extracting procedure to be executed in FIG. 2 will be described below.

The united monitoring organization 200 monitors data distributed or used in the network 210. If data which seems to be an illegitimate copy is found or reported on the network, the monitoring organization 200 extracts information embedded by the common electronic-watermark method, by the use of the common-electronic-watermark extracting apparatus 205. With this operation, the organization which embedded the information or the used method is identified, and the data is sent to the identified organization.

The organization which receives the data extracts various types of embedded information, by the use of the electronic-watermark extracting apparatus thereof, which is either of the type-A to type-D electronic-watermark extracting apparatuses 206 to 209.

According to the present embodiment, even in a system which uses different electronic-watermark methods in a mixed way, each organization only needs to manage an embedding section and an extracting section for its own electronic-watermark method, without preparing embedding sections and extracting sections for many electronic-watermark methods. Illegitimate copying is efficiently monitored.

Even when an electronic watermark is not found, safety is enhanced for the following reasons. If electronic-watermark information is not found, it is difficult to differentiate among whether the data does not include electronic-watermark information from the beginning, whether an electronic watermark has been embedded by another method, and whether electronic-watermark information is broken by an attack. Since the common electronic-watermark method has a high robustness, it is difficult for an attack to break electronic-watermark information generated by the method.

Therefore, when electronic-watermark information generated by the common electronic-watermark method is extracted in a first process, a possibility of not having electronic-watermark information from the beginning is eliminated. An electronic-watermark method unique to each organization may be used. When detailed information is embedded, a large amount of information is embedded and an electronic-watermark method having a relatively low robustness with suppression of quality deterioration being focused on is used in many cases. Therefore, after electronic-watermark information generated by the common electronic-watermark method is extracted, when electronic-watermark information generated by the electronic-watermark method unique to each organization is not found, it can be said that electronic-watermark information has been broken by an attack.

Therefore, overall safety has been improved by this system, as compared with a case in which each organization independently uses a unique electronic-watermark method.

In the present embodiment, four organizations are included. It is clear that the present invention can also be applied in the same way to a system having any number of organizations.

(Second Embodiment)

Figure 3:
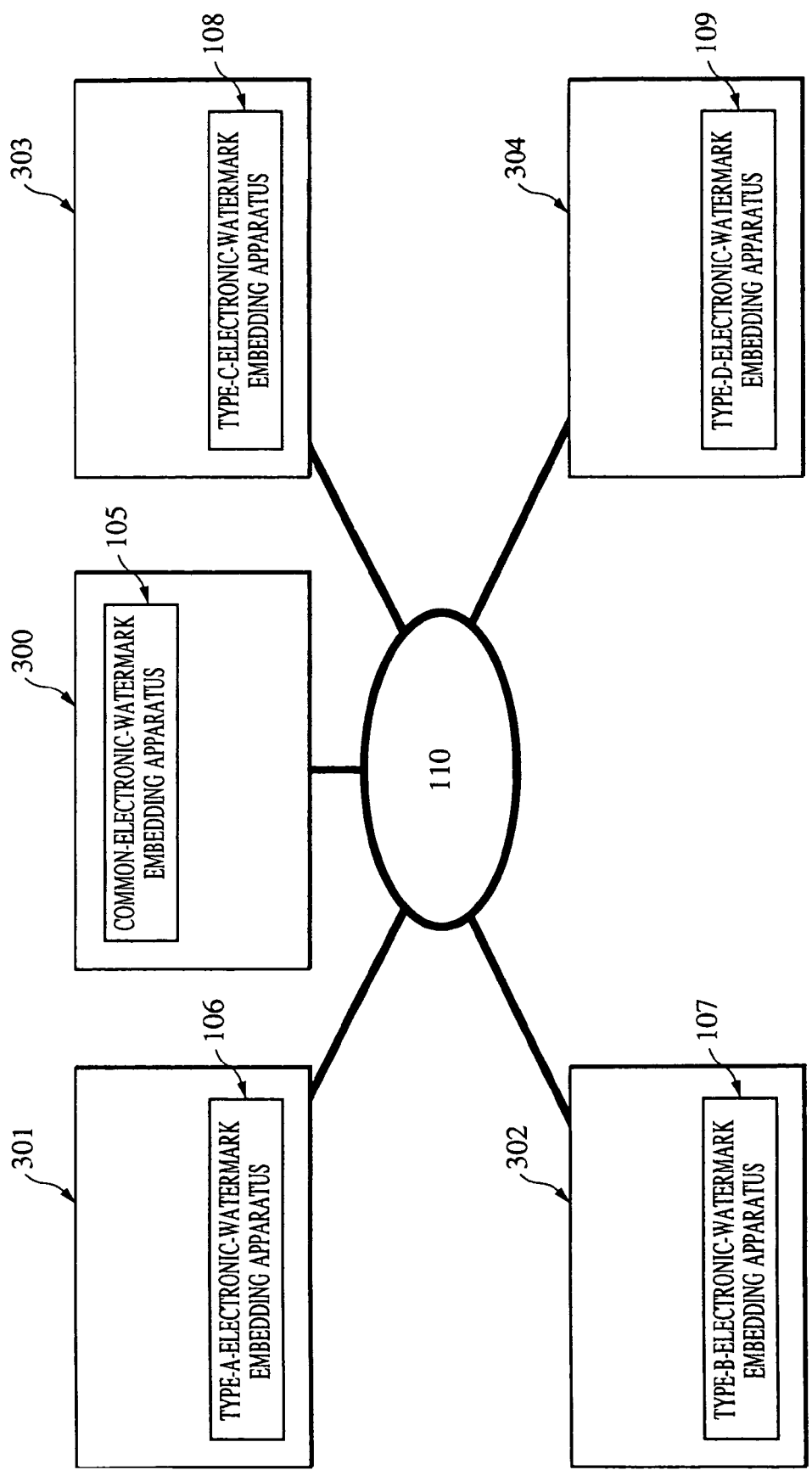
FIG. 3 is a block diagram of a portion related to electronic-watermark embedding in an information processing system according to a second embodiment of the present invention.

FIG. 3 shows a portion related to electronic-watermark embedding in an information processing system according to a second embodiment of the present invention. In the present embodiment, only a common-electronic-watermark embedding organization 300 uses the common electronic-watermark embedding apparatus 105 for embedding.

Organizations 301 to 304 only have the type-A to type-D electronic-watermark embedding apparatuses 106 to 109, which use the unique electronic-watermark methods. The organizations 301 to 304 are formed by removing the common-electronic-watermark embedding apparatuses 105 from the organizations 101 to 104 shown in FIG. 1. A network 110 connects the organizations 301 to 304.

A united copyright management organization, such as Japanese Society for Right of Authors, Composers and Publishers (JASRAC) for musical copyrighted materials, can serve as the common-electronic-watermark embedding organization 300. Sales shops which sell the users copyrighted materials controlled by the common-electronic-watermark embedding organization 300 can serve as the organizations 301 to 304. The present embodiment does not limit cases to which the present invention is applied. The present invention includes all techniques in which the common-electronic-watermark method having a high robustness and an electronic-watermark method unique to each organization are used according to conditions.

The organizations 301 to 304 (including each copyright holder) register copyrighted materials at the organization 300 and ask it to execute embedding with the use of the common-electronic-watermark embedding apparatus 105. The organization 300 embeds predetermined information by the common electronic-watermark method, and sends back data to the organizations 301 to 304. The organizations 301 to 304 use the type-A to type-D embedding apparatuses 106 to 109, which employ the unique electronic-watermark methods, to embed various types of information.

The present embodiment has the following advantages over the first embodiment.

In the first embodiment, since each organization performs embedding by the common electronic-watermark method, the common electronic-watermark method and its key need to be made public to each organization. It is better to keep the common electronic-watermark method and its key confidential for safety. If even one organization leaks information, the entire safety cannot be maintained. In the present embodiment, however, since the common electronic-watermark method does not need to be made public to the organizations 301 to 304, safety is enhanced.

The present embodiment can be combined with the first embodiment. When, in FIG. 3, the organizations 301 and 302 have the common electronic-watermark embedding apparatuses 105 in the same way as in the first embodiment, for example, the organizations 303 and 304, which do not have the common electronic-watermark apparatus 105, performs the same processing as in the present embodiment, and the organizations 301 and 302, which have the common electronic-watermark apparatuses 105, can embed the predetermined information by the common electronic-watermark method within their organizations, as in the first embodiment.

Figure 4:
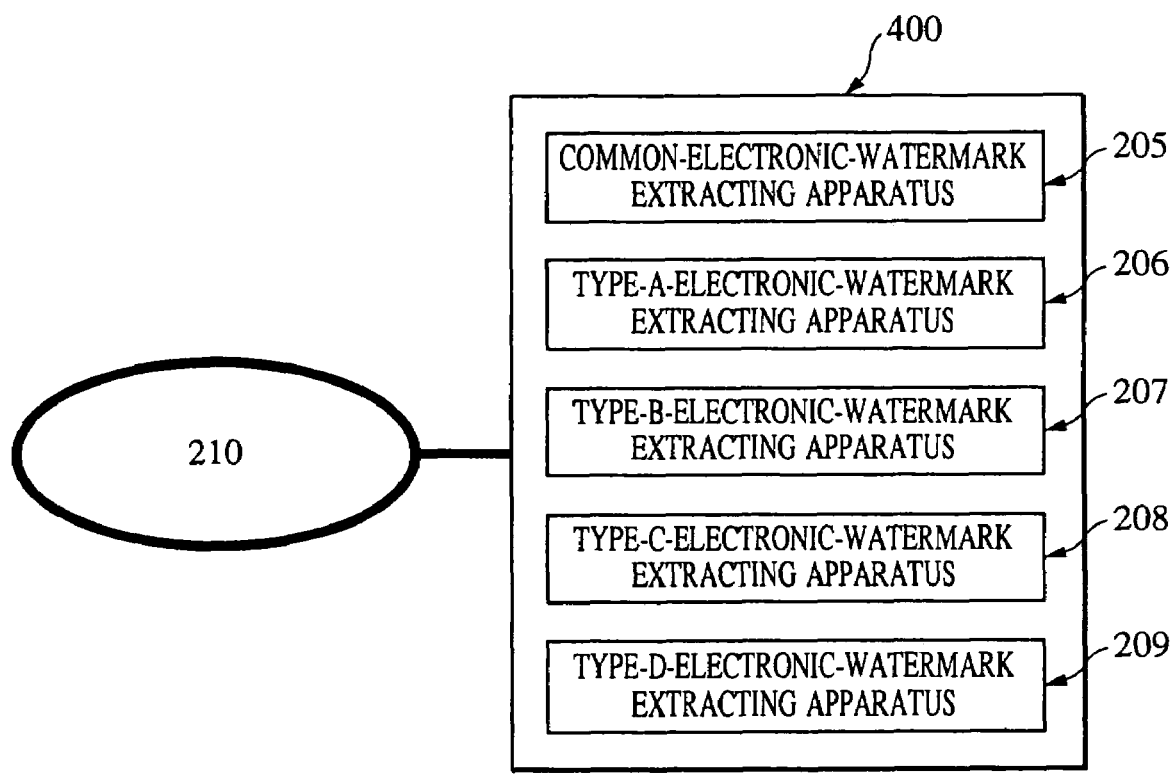
FIG. 4 is a block diagram of a portion related to electronic-watermark extracting in the information processing system according to the second embodiment of the present invention.

FIG. 4 shows a portion related to electronic-watermark extracting in the information processing system according to the second embodiment.

In FIG. 4, a united monitoring organization 400 includes the common-electronic-watermark extracting apparatus 205, corresponding to the common-electronic-watermark embedding apparatus 105, and the type-A to type-D electronic-watermark extracting apparatuses 206 to 209, corresponding to the type-A to type-D electronic-watermark embedding apparatuses 106 to 109 which employ the electronic-watermark methods unique to the organizations. A network 210 connects to the organizations 301 to 304, although they are not shown in FIG. 4. Instead of the organizations 301 to 304, the organizations 101 to 104 may be connected to the network 210.

An electronic-watermark extracting procedure to be executed in FIG. 4 will be described below.

The organization 400 monitors data distributed or used in the network 210. If data which seems to be an illegitimate copy is found or reported on the network, the organization 400 extracts information embedded by the common electronic-watermark method, by the use of the common-electronic-watermark extracting apparatus 205. With this operation, the organization which embedded the information or the used method is identified. Then, various types of embedded information is extracted by the use of the extracting apparatus which employs the electronic-watermark method unique to the identified organization.

In the system according to the present embodiment, only the united monitoring organization can monitor illegitimate copying. Such a united monitoring organization can be implemented if a finite number of electronic-watermark methods unique to organizations are used. Since the electronic-watermark method unique to each organization is identified by the common electronic-watermark method, it is not necessary to check an electronic watermark with the electronic-watermark method unique to each organization by trial and error, and therefore the system is efficient.

The united monitoring organization does not need to have the electronic-watermark methods unique to all organizations from the beginning. When the used embedding organization is identified by electronic-watermark information obtained by the common electronic-watermark method, it is possible that the united monitoring organization asks the embedding organization to send the extracting means employing the electronic-watermark method unique to the organization and its key.

(Third Embodiment)

Figure 5:
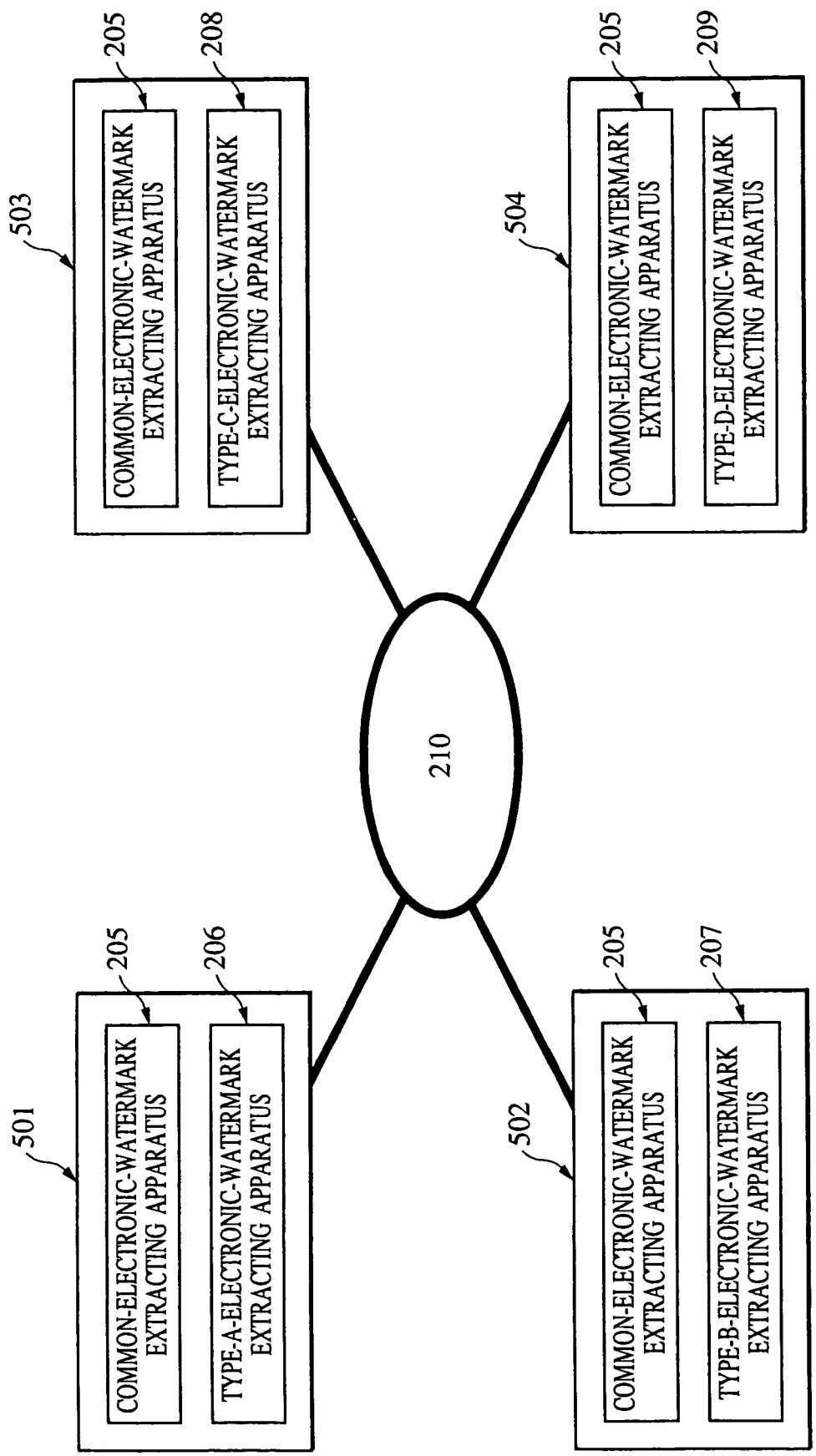
FIG. 5 is a block diagram of a portion related to electronic-watermark extracting in an information processing system according to a third embodiment of the present invention.

FIG. 5 shows a portion related to electronic-watermark extracting corresponding to the electronic-watermark embedding shown in FIG. 1 or FIG. 3.

In FIG. 5, organizations 501 to 504 have the common-electronic-watermark extracting apparatuses 205, corresponding to the common-electronic-watermark embedding apparatus 105, and the type-A to type-D electronic-watermark extracting apparatuses 206 to 209, corresponding to the type-A to type-D embedding apparatuses 106 to 109 employing the electronic-watermark methods unique to the organizations, respectively.

An electronic-watermark extracting procedure to be executed in FIG. 5 will be described below.

Each of the organizations 501 to 504 monitors data distributed or used on the network 210. If data which seems to be an illegitimate copy is found or reported in the network, the organization extracts information embedded by the common electronic-watermark method, by the use of the common-electronic-watermark extracting apparatus 205. With this operation, the organization which embedded the information or the used method is identified. When it is determined that the organization employs the used method, it extracts information by the electronic-watermark extracting apparatus unique to the organization. When it is determined that another organization employs the used method, a notice is sent to the organization or the obtained information is discarded, according to conditions.

In the system according to the present embodiment, illegitimate copying can be monitored without having a united monitoring organization. This system can be applied to either of the embedding systems shown in FIG. 1 and FIG. 3. It is also clear that the extracting systems shown in FIG. 2 and FIG. 4 can be applied to either of the embedding systems shown in FIG. 1 and FIG. 3.

The system shown in FIG. 5 can be combined with that shown in FIG. 2 and that shown in FIG. 4. When the organization 200 according to the first embodiment shown in FIG. 2 has all of the type-A to type-D electronic-watermark extracting apparatuses as the organization 400 according to the second embodiment, and the organizations 201 and 202 have the common-electronic-watermark extracting apparatuses 205 in the same way as in the third embodiment, for example, the organizations 203 and 204, which do not have the common-electronic-watermark extracting apparatus 205, execute the same processing as in the first embodiment, and the organizations 200, 210, and 202 can extract electronic-watermark information by the use of the common-electronic-watermark extracting apparatuses 205 within their organizations as in the second and third embodiments.

With the above cases being included, the present invention includes all techniques in which the common-electronic-watermark method having a high robustness and an electronic-watermark method unique to each organization are used according to conditions.

(Fourth Embodiment)

In the embedding systems shown in FIG. 1 and FIG. 3, it is possible that each organization has the electronic-watermark extracting apparatus corresponding to the electronic-watermark embedding apparatus and an electronic-watermark extracting check is performed before electronic-watermark embedding.

This configuration can be applied to the first embodiment, the second embodiment, and a combination thereof. A fourth embodiment will be described below by referring to FIG. 6 with the embodiment shown in FIG. 3 being taken as an example.

Figure 6:
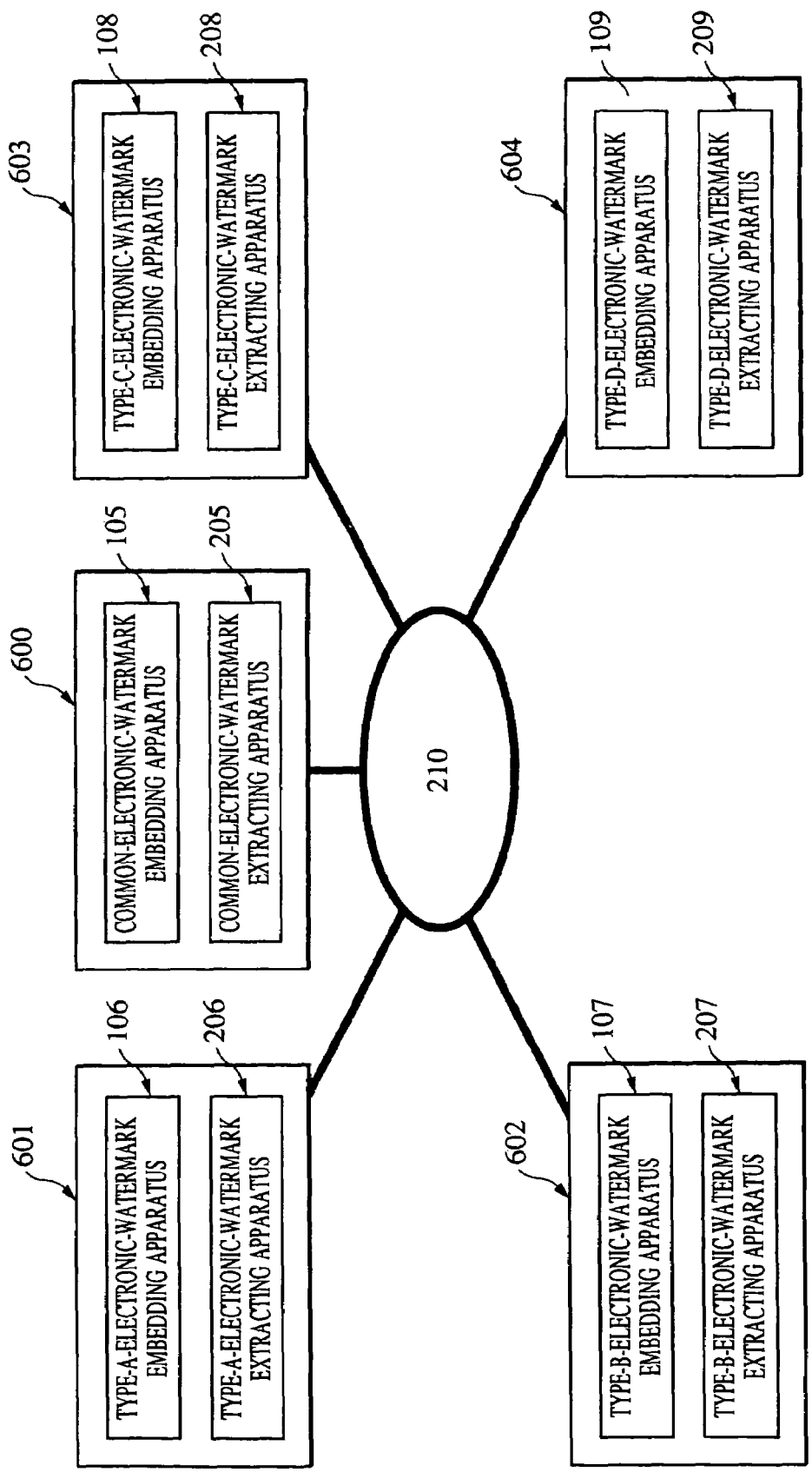
FIG. 6 is a block diagram of a portion related to electronic-watermark embedding and extracting in an information processing system according to a fourth embodiment of the present invention.

In FIG. 6, a common-electronic-watermark embedding organization 600 includes the common-electronic-watermark embedding apparatus 105 and the corresponding common-electronic-watermark extracting apparatus 205. Organizations 601 to 604 have the type-A to type-D electronic-watermark embedding apparatuses 106 to 109 employing the electronic-watermark methods unique to the organizations and the corresponding the type-A to type-D electronic-watermark extracting apparatuses 206 to 209.

Each of the organizations 601 to 604 registers a copyrighted material at the organization 600 and asks it to embed information by the use of the common-electronic-watermark embedding apparatus 105. The organization 600 checks whether the copyrighted material is not an illegitimate copy by the use of the common-electronic-watermark extracting apparatus 205 before using the common-electronic-watermark embedding apparatus 105. When it is determined by the common-electronic-watermark extracting apparatus 205 that the common electronic watermark has been embedded in the copyrighted material, the organization 600 asks the embedding-request-source organization or the organization identified by the electronic-watermark information if there is no problem. When there is no problem, the organization 600 sends back predetermined information to the embedding-request-source organization by the common-electronic-watermark embedding apparatus 105. The embedding-request-source organization embeds various types of information by the use of the electronic-watermark embedding apparatus, one of the apparatuses 106 to 109.

According to the system of the present embodiment, electronic-watermark overwriting caused by an illegitimate report of a requester can be prevented. In addition, an efficient system is implemented because an electronic-watermark embedding organization and an electronic-watermark extracting organization are integrated as a unit.

A recording medium according to another embodiment of the present invention will be described below.

The present invention is not limited to cases in which the systems and the apparatuses described in the above embodiments are combined. The present invention also includes cases in which a software program code for implementing each of the above embodiments is sent to the systems or the computers (CPUs or MPUs) of the apparatuses and the systems or the computers of the apparatuses operate the above-described various devices according to the program code to implement each of the above embodiments.

In these cases, the program code of the software itself implements the functions of the above embodiments. Therefore, the present invention includes the program code itself, and means for sending the program code to a computer, specifically, a recording medium for storing the program code.

As recording media for storing the program code, semiconductor memories such as ROMs and RAMs, floppy disks, hard disks, optical disks, magneto-optical disks, CD-ROMs, magnetic tape, and non-volatile memory cards can be used.

The present invention includes the program code not only in cases in which the computers control various devices only according to the sent program code to implement the functions of the above-described embodiments, but also in cases in which the program code implements the above-described embodiments together with the operating systems operating on the computers or with other application software programs.

The present invention also includes a case in which a program code is stored in a memory provided for a function extending board or a function extending unit connected to a computer; a CPU provided for the function extending board or the function extending unit executes a part or the whole of actual processing; and the above-described embodiments are implemented by the processing.

As described above, according to the above embodiments, even in a system which uses different electronic-watermark methods, a monitoring organization efficiently monitors illegitimate copying without having many electronic-watermark embedding apparatuses and many electronic-watermark extracting apparatuses. Improved safety is provided even in a case in which an electronic watermark is not found, as compared with a case in which each electronic-watermark method is used alone.

What is claimed is:

1. An information distribution processing system in which a plurality of information processing apparatuses are connected through a network comprising:
    a first information processing apparatus comprising a first additional unit adapted to add first additional information to distribution information as an electronic watermark using a first adding method;
    a second information processing apparatus comprising a second additional unit adapted to add second additional information to distribution information as an electronic watermark using a second adding method; and
    a third information processing apparatus comprising:
        a first reception unit adapted to receive distribution information, to which is added the first additional information and the second additional information;
        a first extraction unit adapted to extract the first additional information from the first received distribution information by using a first extracting method corresponding to the first adding method; and
        an identification unit adapted to identify a fourth information processing apparatus based on the extracted first additional information, said identified fourth information processing apparatus comprising:
            a second reception unit adapted to receive distribution information, to which is added the first additional information and the second additional information; and
            a second extraction unit adapted to extract the second additional information from the second received distribution information by using a second extracting method corresponding to the second adding method.

2. A system according to claim 1, wherein said identification unit identifies furthermore the second adding method based on the extracted first additional information.

3. A system according to claim 1, wherein said first additional unit adds first additional information to distribution information as an electronic watermark using a first adding method with confidential information common to the plurality of information processing apparatuses.

4. A system according to claim 1, further comprising determination unit adapted to determine that an attack has been made to the distribution information when either the first additional information or the second additional information is extracted, and the distribution information has no additional information when neither the first additional information nor the second additional information is extracted.

5. A system according to claim 1, wherein the second additional information indicates copyright of the distribution information.

6. A system according to claim 1, wherein the first adding method is different from the second adding method.

7. An information adding apparatus connected to a plurality of information processing apparatuses through a network, comprising:
    an acquisition unit adapted to acquire distribution information; and
    an additional unit adapted to add first additional information to the acquired distribution information as an electronic watermark using a first adding method, wherein the distribution information is added to the first additional information and second additional information in the end, and the first additional information identifies one of the information processing apparatuses which is able to extract the second additional information from the distribution information.

8. An information adding apparatus according to claim 7, wherein said additional unit adds the first additional information to the acquired distribution information as an electronic watermark using the first adding method with confidential information common to the plurality of information processing apparatuses.

9. An information adding apparatus according to claim 7, wherein the second additional information indicates copyright of the distribution information.

10. An information adding apparatus according to claim 7, wherein the first adding method is different from a second adding method which is used to add the second additional information to the distribution information.

11. An information extracting apparatus connected to a plurality of information processing apparatuses through a network comprising:
an acquisition unit adapted to acquire distribution information, to which is added first additional information as an electronic watermark using a first adding method and second additional information as an electronic watermark using a second adding method;
an extraction unit adapted to extract the first additional information from the acquired distribution information using a first extracting method corresponding to the first adding method; and
an identification unit adapted to identify and information processing apparatus, which is able to extract the second additional information from the distribution information using a second extracting method corresponding to the second adding method, based on the extracted first additional information.

12. An information extracting apparatus according to claim 11, further comprising forwarding unit adapted to forward the acquired distribution information to the identified information processing apparatus.

13. An information extracting apparatus according to claim 11, further comprising determination unit adapted to determine that an attack has been made to the distribution information when the first additional information is not extracted by said extraction unit.

14. An information extracting apparatus according to claim 11, wherein the second additional information indicates copyright of the distribution information.

15. An information extracting apparatus according to claim 11, wherein the first adding method is different from the second adding method.

16. An information extracting apparatus connected to a plurality of information processing apparatuses through a network comprising:
an acquisition unit adapted to acquire distribution information, to which is added first additional information as an electronic watermark using a first adding method and second additional information as an electronic watermark using a second adding method; and
an extraction unit adapted to extract the second additional information from the acquired distribution information using a second extracting method corresponding to the second adding method, wherein said information extracting apparatus is identified based on the first additional information.

17. An information extracting apparatus according to claim 16, further comprising determination unit adapted to determine that an attack has been made to the distribution information when the second additional information is not extracted by said extraction unit.

18. An information extracting apparatus according to claim 16, wherein the second additional information indicates copyright of the distribution information.

19. An information extracting apparatus according to claim 16, wherein the first adding method is different from the second adding method.

20. A method comprising:
adding first additional information to distribution information as an electronic watermark using a first adding method;
adding second additional information to distribution information as an electronic watermark using a second adding method;
receiving the distribution information, to which is added the first additional information and the second additional information;
extracting the first additional information from the first received distribution information by using a first extracting method corresponding to the first adding method; and
identifying an information processing apparatus based on the extracted first additional information, said identified information processing apparatus comprising:
a second reception unit adapted to receive distribution information, to which is added the first additional information and the second additional information; and
a second extraction unit adapted to extract the second additional information from the second received distribution information by using a second extracting method corresponding to the second adding method.

21. A method according to claim 20 wherein said identifying step identifies furthermore the second adding method based on the extracted first additional information.

22. A method according to claim 20 wherein said first additional information is added to distribution information as an electronic watermark using a first adding method with confidential information common to the plurality of information processing apparatuses.

23. A method according to claim 20, further comprising determining that an attack has been made to the distribution information when either the first additional information or the second additional information is extracted, and the distribution information has no additional information when neither the first additional information nor the second additional information is extracted.

24. A method according to claim 20 wherein the second additional information indicates copyright of the distribution information.

25. A method according to claim 20, wherein the first adding method is different from the second adding method.

26. A method for use in an information adding apparatus connected to a plurality of information processing apparatuses through a network, comprising:
acquiring distribution information; and
adding first additional information to the acquired distribution information as an electronic watermark using a first adding method, wherein the distribution information is added to the first additional information and second additional information in the end, and the first additional information identifies one of the information processing apparatuses which is able to extract the second additional information from the distribution information.

27. A method according to claim 26, wherein said adding step adds the first additional information to the acquired distribution information as an electronic watermark using the first adding method with confidential information common to the plurality of information processing apparatuses.

28. A method according to claim 26, wherein the second additional information indicates copyright of the distribution information.

29. A method according to claim 26, wherein the first adding method is different from a second adding method which is used to add the second additional information to the distribution information.

30. A method for use in an information extracting apparatus connected to a plurality of information processing apparatuses through a network comprising:
acquiring distribution information, to which is added first additional information as an electronic watermark using a first adding method and second additional information as an electronic watermark using a second adding method;
extracting the first additional information from the acquired distribution information using a first extracting method corresponding to the first adding method; and
identifying information processing apparatus, which is able to extract the second additional information from the distribution information using a second extracting method corresponding to the second adding method, based on the extracted first additional information.

31. A method according to claim 30, further comprising a forwarding step to forward the acquired distribution information to the identified information processing apparatus.

32. A method according to claim 30, further comprising a determination step to determine that an attack has been made to the distribution information when the first additional information is not extracted by said extraction unit.

33. A method according to claim 30, wherein the second additional information indicates copyright of the distribution information.

34. A method according to claim 30, wherein the first adding method is different from the second adding method.

35. A method for use in an information extracting apparatus connected to a plurality of information processing apparatuses through a network, comprising:
acquiring distribution information, to which is added first additional information as an electronic watermark using a first adding method and second additional information as an electronic watermark using a second adding method; and
extracting the second additional information from the acquired distribution information using a second extracting method corresponding to the second adding method, wherein said information extracting apparatus is identified based on the first additional information.

36. A method according to claim 35, further comprising determining that an attack has been made to the distribution information when the second additional information is not extracted by said extraction unit.

37. A method according to claim 35, wherein the second additional information indicates copyright of the distribution information.

38. A computer-readable program product for a system in which a plurality of information processing apparatuses are connected through a network, the program product comprising a recording medium having code for:
controlling a first additional unit adapted to add first additional information to distribution information as an electronic watermark using a first adding method;
controlling a second additional unit adapted to add second additional information to distribution information as an electronic watermark using a second adding method; and
controlling a third information processing apparatus comprising:
first reception unit adapted to receive distribution information, to which is added the first additional information and the second additional information;
first extraction unit adapted to extract the first additional information from the first received distribution information by using a first extracting method corresponding to the first adding method; and
identification unit adapted to identify a fourth information processing apparatus based on the extracted first additional information, said identified fourth information processing apparatus comprising:
second reception unit adapted to receive distribution information, to which is added the first additional information and the second additional information; and second extraction unit adapted to extract the second additional information from the second received distribution information by using a second extracting method corresponding to the second adding method.

39. A program according to claim 38, wherein said identification unit identifies furthermore the second adding method based on the extracted first additional information.

40. A program according to claim 38, wherein said first additional information to distribution information as an electronic watermark using a first adding method with confidential information common to the plurality of information processing apparatuses.

41. A program according to claim 38, further comprising code for determining that an attack has been made to the distribution information when either the first additional information or the second additional information is extracted, and the distribution information has no additional information when neither the first additional information nor the second additional information is extracted.

42. A program according to claim 38, wherein the second additional information indicates copyright of the distribution information.

43. A program according to claim 38, wherein the first adding method is different from the second adding method.

44. A computer-readable program product for controlling an adding apparatus connected to a plurality of information processing apparatuses through a network, the program product comprising a recording medium having code for:
acquiring distribution information; and
adding either first additional information to the acquired distribution information as an electronic watermark using a first adding method wherein the distribution information is added to the first additional information and the second additional information in the end, and the first additional information identifies an information processing apparatus which is able to extract the second additional information from the distribution information.

45. A program according to claim 44, wherein said adding step adds the first additional information to the acquired distribution information as an electronic watermark using the first adding method with confidential information common to the plurality of information processing apparatuses.

46. A program according to claim 44, wherein the second additional information indicates copyright of the distribution information.

47. A program according to claim 44, wherein the first adding method is different from a second adding method which is used to add the second additional information to the distribution information.

48. A computer-readable program product for controlling an extracting apparatus connected to a plurality of information processing apparatuses through a network, the program product comprising a recording medium having code for:

acquiring distribution information, to which is added first additional information as an electronic watermark using a first adding method and second additional information as an electronic watermark using a second adding method;

extracting the first additional information from the acquired distribution information using a first extracting method corresponding to the first adding method; and identifying an information processing apparatus, which is able to extract the second additional information from the distribution information using a second extracting method corresponding to the second adding method, based on the extracted first additional information.

49. A program according to claim 48, further comprising code for forwarding the acquired distribution information to the identified information processing apparatus.

50. A program according to claim 48, further comprising code for determining that an attack has been made to the distribution information when the first additional information is not extracted by said extracting step.

51. A program according to claim 48, wherein the second additional information indicates copyright of the distribution information.

52. A program according to claim 48, wherein the first adding method is different from the second adding method.

53. A computer-readable program product for controlling an information extracting apparatus connected to a plurality of information processing apparatuses through a network, the program product comprising a recording medium having code for:

acquiring distribution information, to which is added first additional information as an electronic watermark using a first adding method and second additional information as an electronic watermark using a second adding method;

and extracting the second additional information from the acquired distribution information using a second extracting method corresponding to the second adding method, wherein said information extracting apparatus is identified based on the first additional information.

54. A program according to claim 53, further comprising code for determining that an attack has been made to the distribution information when the second additional information is not extracted by said extracting step.

55. A program according to claim 53, wherein the second additional information indicates copyright of the distribution information.

\* \* \* \* \*

UNITED STATES PATENT AND TRADEMARK OFFICE
CERTIFICATE OF CORRECTION

PATENT NO. : 7,200,231 B2 Page 1 of 1
APPLICATION NO. : 11/095845
DATED : April 3, 2007
INVENTOR(S) : Keiichi Iwamura It is certified that error appears in the above-identified patent and that said Letters Patent is hereby corrected as shown below:

Col. 1, line 62, "are" should read --is--.

Col. 13, line 30, "and" should read --an--.

Col. 14, line 34, "claim 20" should read --claim 20,--.

line 37, "claim 20" should read --claim 20,--.

line 49, "claim 20" should read --claim 20,--.

Signed and Sealed this

Fifteenth Day of April, 2008

JON W. DUDAS
*Director of the United States Patent and Trademark Office*